US012479590B2

(12) United States Patent
Miller et al.

(10) Patent No.: US 12,479,590 B2
(45) Date of Patent: Nov. 25, 2025

(54) TURBINE ENGINE FOR AN AIRCRAFT INCLUDING A CONTRAIL MITIGATION SYSTEM

(71) Applicant: General Electric Company, Schenectady, NY (US)

(72) Inventors: Brandon W. Miller, Middletown, OH (US); David M. Ostdiek, Liberty Township, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 61 days.

(21) Appl. No.: 18/622,275

(22) Filed: Mar. 29, 2024

(65) Prior Publication Data

US 2025/0304275 A1 Oct. 2, 2025

(51) Int. Cl.
*B64D 37/34* (2006.01)
*F02C 7/224* (2006.01)

(52) U.S. Cl.
CPC .............. *B64D 37/34* (2013.01); *F02C 7/224* (2013.01); *F05D 2270/08* (2013.01)

(58) Field of Classification Search
CPC . B64D 37/34; F02C 7/224; F02C 7/22; F05D 2220/323; F05D 2270/08
See application file for complete search history.

(56) References Cited

U.S. PATENT DOCUMENTS

| 3,289,409 | A | 12/1966 | Schirmer |
| 3,517,505 | A | 6/1970 | Anderson et al. |
| 7,971,438 | B2 | 7/2011 | Taylor et al. |
| 9,650,968 | B2 | 5/2017 | Swann |
| 11,635,022 | B1 * | 4/2023 | Terwilliger ............... F02C 7/12 60/775 |
| 11,643,978 | B2 | 5/2023 | Swann et al. |

(Continued)

FOREIGN PATENT DOCUMENTS

| FR | 3127269 A1 | 3/2023 |
| FR | 3130896 A1 | 6/2023 |

(Continued)

OTHER PUBLICATIONS

Rambo et al., U.S. Appl. No. 18/416,269, filed Jan. 18, 2024.

(Continued)

*Primary Examiner* — Devon C Kramer
*Assistant Examiner* — Rodolphe Andre Chabreyrie
(74) *Attorney, Agent, or Firm* — Venable LLP; David D. Leege; Michele V. Frank

(57) ABSTRACT

A turbine engine for an aircraft includes a fuel delivery assembly for a hydrocarbon fuel to flow therethrough, a combustor combusting the fuel to generate combustion gases, and a core air exhaust nozzle exhausting the combustion gases from the turbine engine. The turbine engine also includes a contrail mitigation system having a heater and a fuel precipitate separator. The heater is selectively operable to heat the hydrocarbon fuel and to generate fuel precipitates in the hydrocarbon fuel, and the fuel precipitate separator separates the fuel precipitates generated by the heater from the fuel. A controller is coupled to the heater to operate the heater to heat the hydrocarbon fuel and to generate fuel precipitates in the hydrocarbon fuel in response to a contrail mitigation input.

20 Claims, 4 Drawing Sheets

(56) References Cited

U.S. PATENT DOCUMENTS

| | | | |
|---|---|---|---|
| 2004/0194627 A1* | 10/2004 | Huang | B01D 69/107 96/6 |
| 2018/0016986 A1* | 1/2018 | Cordatos | B01D 35/005 |
| 2018/0135531 A1 | 5/2018 | Widener et al. | |
| 2021/0001269 A1 | 1/2021 | Klingels | |
| 2023/0193787 A1 | 6/2023 | Stratton | |
| 2023/0272749 A1 | 8/2023 | Li et al. | |
| 2024/0426242 A1* | 12/2024 | Terwilliger | F25J 3/046 |

FOREIGN PATENT DOCUMENTS

| | | | |
|---|---|---|---|
| FR | 3130897 A1 | 6/2023 | |
| FR | 3133367 A1 | 9/2023 | |
| FR | 3133368 A1 | 9/2023 | |

OTHER PUBLICATIONS

Miller et al., U.S. Appl. No. 18/461,651, filed Sep. 6, 2023 [Available in Ifw].

Coordinating Research Council, Inc. "Handbook of Aviation Fuel Properties," CRC Report No. 635, Third Edition, p. i-xiv and 1-1-4-18 (2004).

* cited by examiner

TURBINE ENGINE FOR AN AIRCRAFT INCLUDING A CONTRAIL MITIGATION SYSTEM

TECHNICAL FIELD

The present disclosure relates to turbine engines, particularly, turbine engines for aircraft.

BACKGROUND

Turbine engines used in aircraft generally include a fan and a turbo-engine arranged in flow communication with one another. A combustor is arranged in the turbo-engine to generate combustion gases for driving a turbine in the turbo-engine of the turbine engine. The combustion gases are then typically exhausted from the turbine engine to the atmosphere.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
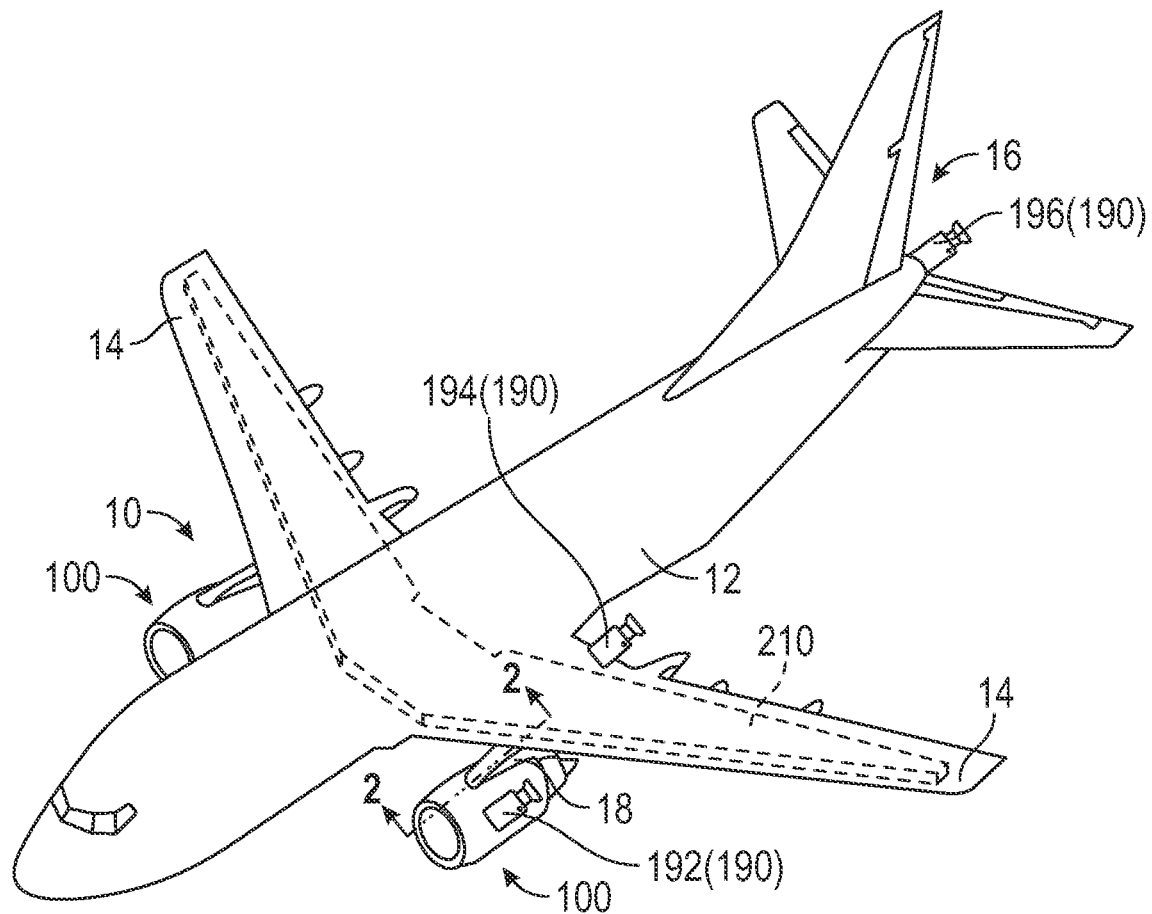
FIG. 1 is a schematic view of an aircraft having turbine engines according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "directly upstream" or "directly downstream," when used to describe the relative placement of components in a fluid pathway, refer to components that are placed next to each other in the fluid pathway without any intervening components between them other than an appropriate fluid coupling, such as a pipe, a tube, a valve, or the like, to fluidly couple the components. Such components may be spaced apart from each other with intervening components that are not in the fluid pathway.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As discussed above, the turbine engine exhausts combustion gases. These relatively hot combustion gases may include water vapor. When the turbine engine is used with an aircraft, the combustion gases mix with the cold air surrounding the engine as the combustion gases are discharged from the turbine engine, and the water vapor condenses under certain atmospheric conditions forming contrails. Particles in the exhaust gases form nucleation or condensation points for the water vapor, promoting contrail formation. Embodiments discussed herein utilize a contrail mitigation system to reduce the particles in the exhaust gases and, thus, contrail formation. This contrail mitigation system can be activated when contrails are detected or conditions are such that contrail formation is likely. More specifically, in embodiments discussed herein, the contrail mitigation system reduces particles in the exhaust gases by purposely generating fuel precipitates, such as coke particles, in a hydrocarbon fuel and removing those particles before the hydrocarbon fuel is injected and combusted in the combustor.

The contrail mitigation system is suitable for use on an aircraft. FIG. 1 is a perspective view of an aircraft 10 that can implement various embodiments. The aircraft 10 shown in FIG. 1 is an airplane and includes a fuselage 12, wings 14 attached to the fuselage 12, and an empennage 16. Although the aircraft 10 shown in FIG. 1 is an airplane, the embodiments described herein can also be applicable to other aircraft, including, for example, helicopters and unmanned aerial vehicles (UAV). The aircraft 10 also includes a propulsion system that produces a propulsive thrust required to propel the aircraft 10 in flight, during taxiing operations, and the like. The propulsion system for the aircraft 10 shown in FIG. 1 includes a pair of turbine engines 100. In this embodiment, each turbine engine 100 is attached to one of the wings 14 by a pylon 18 in an under-wing configuration. Although the turbine engines 100 are shown attached to the wing 14 in an under-wing configuration in FIG. 1, in other embodiments, the turbine engine 100 can have alternative configurations and be coupled to other portions of the aircraft 10. For example, the turbine engine 100 can additionally or alternatively include one or more aspects coupled to other parts of the aircraft 10, such as, for example, the empennage 16 and the fuselage 12.

As will be described further below with reference to FIG. 2, the turbine engines 100 shown in FIG. 1 are gas turbine engines that are each capable of selectively generating a propulsive thrust for the aircraft 10. The amount of propulsive thrust can be controlled at least in part based on a volume of fuel provided to the turbine engines 100 via a fuel system 200 (see FIG. 3). An aviation turbine fuel in the embodiments discussed herein is a combustible hydrocarbon liquid fuel, such as a kerosene-type fuel, having a desired carbon number, a synthetic aviation fuel, a biofuel, a bio-diesel, an ethanol, a bioalcohol, and the like. The fuel is stored in a fuel tank 210 of the fuel system 200. As shown in FIG. 1, at least a portion of the fuel tank 210 is located in each wing 14 and a portion of the fuel tank 210 is located in the fuselage 12 between the wings 14. The fuel tank 210, however, can be located at other suitable locations in the fuselage 12 or the wing 14. The fuel tank 210 can also be located entirely within the fuselage 12 or the wing 14. The fuel tank 210 can also be separate tanks instead of a single, unitary body, such as, for example, two tanks each located within a corresponding wing 14.

Figure 2:
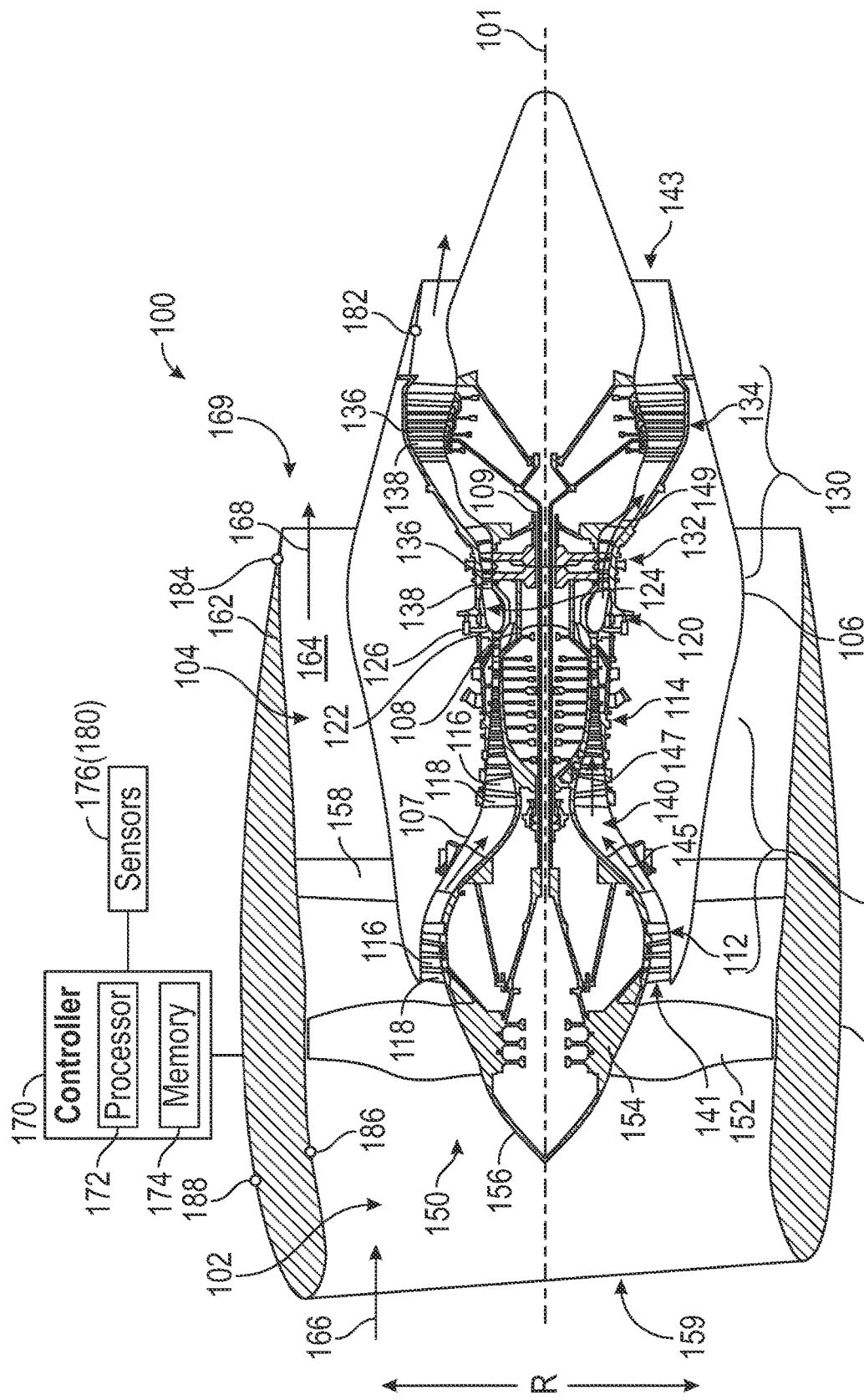
FIG. 2 is a schematic, cross-sectional view, taken along line 2-2 in FIG. 1, of one turbine engine of the aircraft shown in FIG. 1.

FIG. 2 is a schematic, cross-sectional view of one of the turbine engines 100 used in the propulsion system for the aircraft 10 shown in FIG. 1. The cross-sectional view of FIG. 2 is taken along line 2-2 in FIG. 1. The turbine engine 100 has an axial direction A (extending parallel to a longitudinal centerline axis 101, shown for reference in FIG. 2), a radial direction R, and a circumferential direction. The circumferential direction (not depicted in FIG. 2) extends in a direction rotating about the longitudinal centerline axis 101 (the axial direction A). In the embodiment depicted in FIG. 2, the turbine engine 100 is a high bypass turbofan engine, including a fan section 102 and a turbo-engine 104 disposed downstream from the fan section 102.

The turbo-engine 104 depicted in FIG. 1 includes, in serial flow relationship, a compressor section 110, a combustion section 120, and a turbine section 130. The turbo-engine 104 is substantially enclosed within an outer casing 106 (also referred to as a housing or a nacelle) that is substantially tubular and defines a core inlet 141. In this embodiment, the core inlet 141 is annular. As schematically shown in FIG. 1, the compressor section 110 includes a booster or a low-pressure (LP) compressor 112 followed downstream by a high-pressure (HP) compressor 114. The combustion section 120 is downstream of the compressor section 110. The turbine section 130 is downstream of the combustion section 120 and includes a high-pressure (HP) turbine 132 followed downstream by a low-pressure (LP) turbine 134. The turbo-engine 104 further includes core air exhaust nozzle 143 (also referred to as a jet exhaust nozzle) that is downstream of the turbine section 130. The compressor section 110, the combustion section 120, and the turbine section 130 together define, at least in part, a core air flow path 140 extending from the core inlet 141 to the core air exhaust nozzle 143, and through which core air 145 flows. As will be discussed in more detail below, the turbo-engine 104 includes a high-pressure (HP) shaft 108 or a HP spool, and a low-pressure (LP) shaft 109. The HP shaft 108 drivingly connects the HP turbine 132 to the HP compressor 114. The HP turbine 132 and the HP compressor 114 rotate in unison through the HP shaft 108. The LP shaft 109 drivingly connects the LP turbine 134 to the LP compressor 112. The LP turbine 134 and the LP compressor 112 rotate in unison through the LP shaft 109.

Each of the LP compressor 112 and the HP compressor 114 can include a plurality of compressor stages. In each stage, a set of compressor blades 116 rotate relative to a corresponding set of static compressor vanes 118 (also called nozzles) to compress or to pressurize the core air 145 passing through the stage. In a single compressor stage, a plurality of compressor blades 116 can be provided in a ring, extending radially outwardly relative to the longitudinal centerline axis 101 from a blade platform to a blade tip (e.g., extend in the radial direction R). The compressor blades 116 can be a part of a compressor rotor that includes a disk and the plurality of compressor blades 116 extend radially from the disk. Other configurations of the compressor rotor can be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. The core casing can define, at least in part, the core air flow path 140. Each compressor stage can be used to sequentially compress the core air 145 flowing through the core air flow path 140, generating compressed air 147. Any suitable number of compressor blades 116, compressor vanes 118, and compressor stages can be used.

Each of the HP turbine 132 and the LP turbine 134 also can include a plurality of turbine stages. In each stage, a set of turbine blades 136 rotate relative to a corresponding set of static turbine vanes 138 (also called nozzles) to extract energy from combustion gases 149 passing through the stage. The turbine blades 136 can be a part of a turbine rotor. Any suitable configuration for a turbine rotor can be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from the fuel system 200 (see FIG. 3), is injected into a combustion chamber 124 of a combustor 122 by fuel nozzles 126. The fuel is mixed with the compressed air 147 from the compressor section 110 to form a fuel and air mixture, and combusted, generating combustion products (combustion gases 149). As will be discussed further below, adjusting a fuel metering unit 220 of the fuel system changes the volume of fuel provided to the combustion chamber 124 and, thus, changes the amount of propulsive thrust produced by the turbine engine 100 to propel the aircraft 10. The combustion gases are discharged from the combustion chamber 124. These combustion gases can be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages can be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. As noted above, the turbo-engine 104 includes the high-pressure (HP) shaft 108 drivingly connecting the HP turbine 132 to the HP compressor 114, and the low-pressure (LP) shaft 109 drivingly connecting the LP turbine 134 to the LP compressor 112. More specifically, the turbine rotors of the HP turbine 132 are connected to the HP shaft 108, and the compressor rotors of the HP compressor 114 are connected to the HP shaft 108. The combustion gases 149 are routed into the HP turbine 132 and expanded through the HP turbine 132 where a portion of thermal energy or kinetic energy from the combustion gases 149 is extracted via the one or more stages of the turbine blades 136 and turbine vanes 138 of the HP turbine 132. This causes the HP shaft 108 to rotate, which supports operation of the HP compressor 114 (self-sustaining cycle) and rotating the compressor rotors and, thus, the compressor blades 116 of the HP compressor 114 via the HP shaft 108. In this way, the combustion gases 149 do work on the HP turbine 132. The combustion gases 149 are then routed into the LP turbine 134 and expanded through the LP turbine 134. Here, a second portion of the thermal energy or the kinetic energy is extracted from the combustion gases 149 via one or more stages of the turbine blades 136 and turbine vanes 138 of the 134. This causes the LP shaft 109 to rotate, which supports operation of the LP compressor 112 (self-sustaining cycle), and rotating the compressor rotors and, thus, the compressor blades 116 of the LP compressor 112 via the LP shaft 109. In this way, the combustion gases 149 do work on the LP turbine 134. The HP shaft 108 and the LP shaft 109 are disposed coaxially about the longitudinal centerline axis 101. The HP shaft 108 has a diameter greater than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the compressor rotors and the turbine rotors.

The fan section 102 shown in FIG. 2 includes a fan 150 having a plurality of fan blades 152 coupled to a disk 154. The fan blades 152 and the disk 154 are rotatable, together, about the longitudinal centerline (axis) 101 by the LP shaft 109. The LP compressor 112 can also be directly driven by the LP shaft 109, as depicted in FIG. 2. The disk 154 is covered by a rotatable front hub 156 aerodynamically contoured to promote an airflow through the plurality of fan blades 152. Further, a nacelle 160 circumferentially surrounds the fan 150 and/or at least a portion of the turbo-engine 104. The nacelle 160 can also be referred to as an annular fan casing or an outer nacelle. The nacelle 160 is supported relative to the turbo-engine 104 and, more specifically, the outer casing 106 by a plurality of outlet guide vanes 158 that are circumferentially spaced about the nacelle 160 and the turbo-engine 104. A downstream section 162 of the nacelle 160 extends over an outer portion of the turbo-engine 104 and, more specifically, the outer casing 106 so as to define a bypass airflow passage 164 therebetween.

During operation of the turbine engine 100, a volume of air 166 enters the turbine engine 100 through an inlet of the nacelle 160 and/or the fan section 102 (referred to herein as a (an engine inlet 159). As the volume of air 166 passes across the fan blades 152, a first portion of air (bypass air 168) is directed or routed into the bypass airflow passage 164, and a second portion of air (core air 145) is directed or is routed into an upstream section of the core air flow path 140, or, more specifically, into the core inlet 141. The ratio between the bypass air 168 and the core air 145 is commonly known as a bypass ratio. Simultaneously with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust. The bypass air discharge nozzle 169 and the core air exhaust nozzle 143 are air exhaust nozzles of the turbine engine 100.

The turbine engine 100 can also include controller 170. In FIG. 2, the controller 170 is depicted as an engine controller, such as a Full Authority Digital Engine Control (FADEC). The controller 170 is configured to operate various aspects of the turbine engine 100, including the contrail mitigation system 230 (see FIG. 3), discussed herein. In this embodiment, the controller 170 is a computing device having one or more processors 172 and one or more memories 174. The processor 172 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 174 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 174 can store information accessible by the processor 172, including computer-readable instructions that can be executed by the processor 172. The instructions can be any set of instructions or a sequence of instructions that, when executed by the processor 172, causes the processor 172 and the controller 170 to perform operations. In some embodiments, the instructions can be executed by the processor 172 to cause the processor 172 to complete any of the operations and functions for which the controller 170 is configured, as will be described further below. The instructions can be software written in any suitable programming language, or can be implemented in hardware. Additionally, and/or alternatively, the instructions can be executed in logically and/or virtually separate threads on the processor 172. The memory 174 can further store data that can be accessed by the processor 172.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

As will be discussed in more detail below, the controller 170 can be coupled to one or more sensors 176, such as a plurality of sensors. Such sensors 176 can be, for example, temperature sensors, pressure sensors, or humidity sensors. The sensors 176 can be positioned at various suitable locations within the turbine engine 100 or on the aircraft 10.

The turbine engine 100 shown in FIG. 2 and discussed herein (turbofan engine) is provided by way of example only. In other embodiments, any other suitable engine can be utilized with aspects of the present disclosure. For example, in other embodiments, the engine can be any other suitable gas turbine engine, such as a turboshaft engine, a turboprop engine, a turbojet engine, an unducted single fan engine, and the like. In such a manner, in other embodiments, the gas turbine engine can have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 can be a geared turbine engine (e.g., including a gearbox between the fan 150 and a shaft driving the fan, such as the LP shaft 109), can be a variable pitch turbine engine (i.e., including a fan 150 having a plurality of fan blades 152 rotatable about their respective pitch axes), etc. Further, still, in alternative embodiments, aspects of the present disclosure can be incorporated into, or otherwise utilized with, any other type of engine, such as reciprocating engines.

Figure 3:
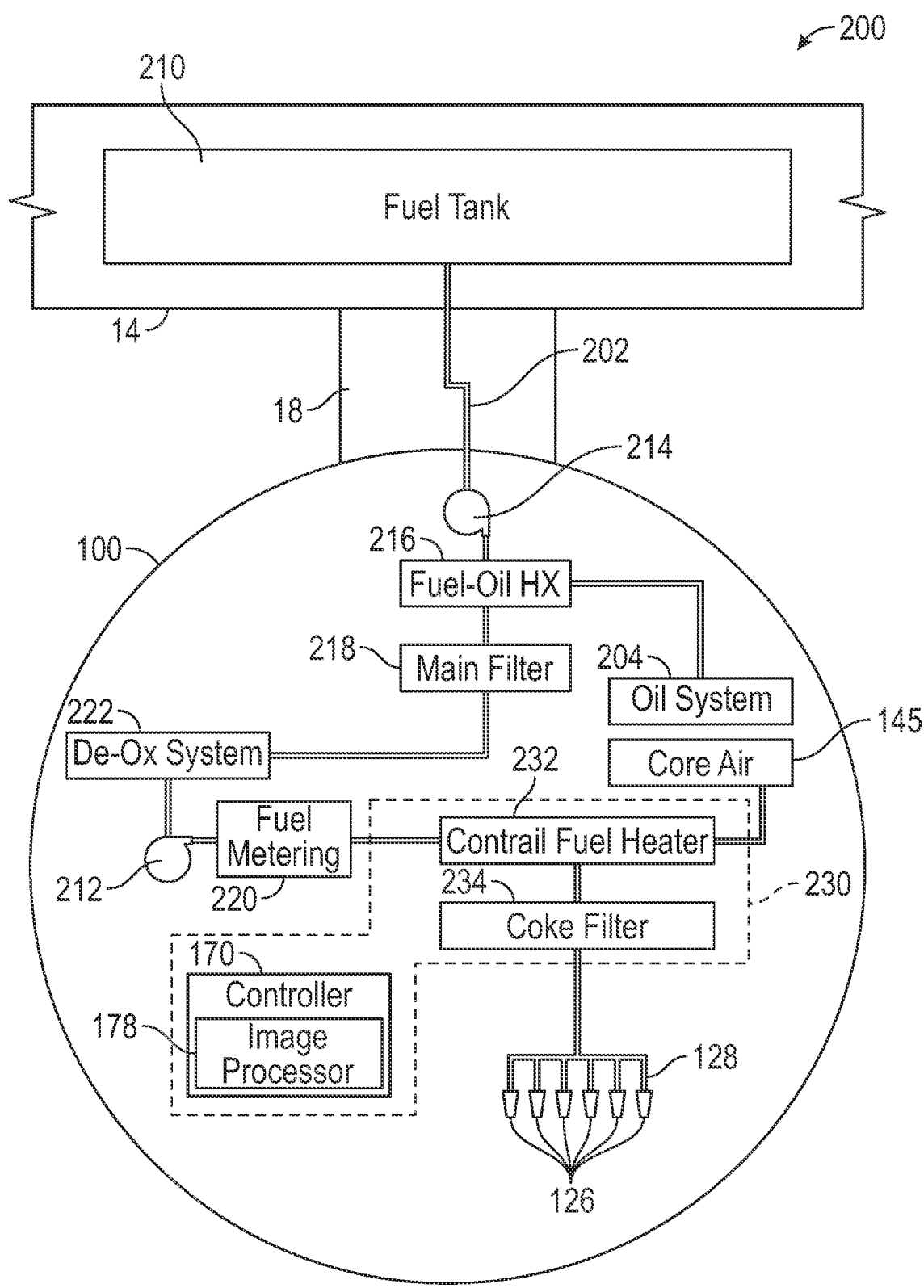
FIG. 3 is a schematic of a fuel system for the turbine engine shown in FIG. 2.

FIG. 3 is a schematic view of the fuel system 200 according to an embodiment of the present disclosure that is configured to store the hydrocarbon fuel for the turbine engine 100 in the fuel tank 210 and to deliver the hydrocarbon fuel to the turbine engine 100 via the fuel delivery assembly 202. In the following discussion, various components are described as being fluidly connected to the fuel delivery assembly 202 or in fluid connection to the fuel delivery assembly 202. These components are also fluidly connected or coupled to each other by, for example, the fuel delivery assembly 202. Various components are also described as being positioned downstream or upstream from other components. A component positioned downstream from another component is configured to receive fuel from the other component, and, likewise, a component positioned upstream of another component is configured to provide fuel to the other component.

The fuel delivery assembly 202 includes tubes, pipes, conduits, and the like, to fluidly connect the various components of the fuel system 200 to the turbine engine 100. As noted above, the fuel tank 210 stores the hydrocarbon fuel therein, and the hydrocarbon fuel is supplied from the fuel tank 210 to the fuel delivery assembly 202. The fuel delivery assembly 202 carries the hydrocarbon fuel between the fuel tank 210 and the turbine engine 100 and, thus, provides a flow path (fluid pathway) for the hydrocarbon fuel from the fuel tank 210 to the turbine engine 100. As noted above, the terms "downstream" and "upstream," as used herein, may be used to describe the position of components relative to the direction of flow of a fluid, such as in the flow of the hydrocarbon fuel in the flow path of the fuel delivery assembly 202. The fuel delivery assembly 202 can also include various valves and other components to deliver the hydrocarbon fuel to the turbine engine 100 that are not shown in FIG. 3.

The fuel system 200 includes at least one fuel pump, and, in the embodiment shown in FIG. 3, a plurality of fuel pumps, fluidly connected to the fuel delivery assembly 202 to induce and to direct the flow of the fuel through the fuel delivery assembly 202 to the turbine engine 100. One such pump is a main fuel pump 212. The main fuel pump 212 is a high-pressure pump that is the primary source of pressure rise in the fuel delivery assembly 202 between the fuel tank 210 and the turbine engine 100. The main fuel pump 212 can be configured to increase a pressure in the fuel delivery assembly 202 to a pressure greater than a pressure within the combustion chamber 124 (FIG. 2) of the combustor 122 (FIG. 2). The fuel system 200 can also include other supplementary pumps, such as an inlet pump 214. The inlet pump 214 is a low-pressure pump that provides an initial pressurization to induce and to direct a flow of the hydrocarbon fuel through the fuel delivery assembly 202. The inlet pump 214 can be operated to provide less of a pressure rise within the fuel delivery assembly 202 than in the main fuel pump 212. In the embodiment shown in FIG. 3, the inlet pump 214 is downstream of the fuel tank 210 and upstream of the main fuel pump 212. Although the inlet pump 214 is shown as being located within the turbine engine 100, the inlet pump 214 also can be suitably located in other portions of the aircraft 10 such as the fuselage 12, the wing 14, or the pylon 18. The inlet pump 214 induces the flow of fuel from the fuel tank 210, and, then, the fuel is heated by a preheater 216.

The preheater 216 is in fluid communication with the fuel delivery assembly 202 and can be any suitable heater, such as an electrical resistance heater, a catalytic heater, or a burner. In some embodiments, such as the one depicted in FIG. 3, the preheater 216 can be a heat exchanger that is in thermal communication with any suitable heat source, such as any suitable engine and/or aircraft heat source. Such an engine heat source can include, for example, an oil system 204 of the turbine engine 100, such as the main lubrication system. The main lubrication system provides a lubricant, such as oil, to various bearings and gear meshes in the compressor section 110, the turbine section 130, the HP shaft 108, and the LP shaft 109, for example. The lubricant provided by the main lubrication system may increase the useful life of such components and may remove a certain amount of heat from such components through the use of one or more heat exchangers. The preheater 216 can be one of those heat exchangers, and can be a fuel-oil heat exchanger (HX) fluidly connected to the main lubrication system (the oil system 204) and to extract heat from the oil of the main lubrication system (the oil system 204) and to heat the hydrocarbon fuel flowing through the preheater 216. The preheater 216 can be configured to heat the fuel to temperatures that avoid the formation of ice in the fuel and to cool the oil of the main lubrication system (the oil system 204). The preheater 216 can be configured to heat the fuel, as measured at the outlet of the preheater 216, to temperatures such as from zero degrees Fahrenheit (0° F.) to two-hundred degrees Fahrenheit (200° F.). Although, the preheater 216 is shown as being located within the turbine engine 100, the preheater 216 also can be suitably located in other portions of the aircraft 10 such as the fuselage 12, the wing 14, or the pylon 18.

The fuel system 200 also includes a main filter 218 in fluid communication with the fuel delivery assembly 202. The main filter 218 is configured to remove contaminant that may be present in the fuel supply and, thus, can be positioned close to the fuel tank 210 and upstream of many of the major components of the fuel system 200, such as, for example, the main fuel pump 212, a fuel metering unit 220, and a de-oxygenation system 222. As depicted in FIG. 3, the main filter 218 is positioned downstream of the fuel tank 210, the inlet pump 214, and the preheater 216. Although the main filter 218 is shown as being located within the turbine engine 100, the main filter 218 can also be suitably located in other portions of the aircraft 10 such as the fuselage 12, the wing 14, or the pylon 18. The main filter 218 can be any suitable filter including, for example, a mesh filter. The main filter 218 can have a nominal micron rating from ten microns (10 μm) to fifty microns (50 μm) to remove potential contaminants.

The fuel system 200 also includes a fuel metering unit 220 in fluid communication with the fuel delivery assembly 202.

The fuel metering unit 220 is positioned downstream of the main fuel pump 212 and upstream of a fuel manifold 128 fluidly connected to the fuel nozzles 126 to distribute fuel to the fuel nozzles 126. The fuel system 200 is configured to provide the fuel to the fuel metering unit 220, and the fuel metering unit 220 is configured to receive fuel from the fuel tank 210. The fuel metering unit 220 is further configured to provide the flow of fuel to the turbine engine 100 in a desired manner. More specifically, the fuel metering unit 220 is configured to meter the fuel and to provide a desired volume of fuel, at, for example, a desired flow rate, to the fuel manifold 128, and thus the fuel nozzles 126. The fuel metering unit 220 can include a metering valve to regulate and to meter the flow of the fuel. The fuel manifold 128 is fluidly connected to the fuel nozzles 126 and distributes (provides) the fuel received to the plurality of fuel nozzles 126, where, as discussed above, the fuel is injected into the combustion chamber 124 and combusted. Adjusting the fuel metering unit 220 changes the volume of fuel provided to the combustion chamber 124 and, thus, changes the amount of propulsive thrust produced by the turbine engine 100 to propel the aircraft 10.

As discussed above, the combustion of the fuel in the combustion section 120 results in combustion gases 149. The combustion gases 149 can include water vapor and other combustion products of the combustion reaction. The combustion gases 149 can also include particulate matter including nonvolatile particulate matter, such as soot and unburned hydrocarbons. This particulate matter may act as a nucleation site or a condensation site for the water vapor when the combustion gases 149 are exhausted from the core air exhaust nozzle 143, forming contrails. The particulate matter not only promotes the condensation of water vapor and the formation of the contrail but may also generate contrails that persist longer than otherwise would be. To mitigate the contrail formation, the turbine engine 100 includes a contrail mitigation system 230 that removes some of this particulate matter or their precursors before combustion. Some of this particulate matter results from longer chain hydrocarbon molecules in the fuel. The composition of turbine fuels (JetA/A1) consists mostly of C9-C16 hydrocarbons that are composed of n-paraffins, isoparaffins, naphthenes, and aromatics. Aromatics tend to form smoke when burned, tend to form coke deposits on combustor surfaces. The maximum concentration of aromatics is controlled in various specifications for turbine fuel with maximum aromatic concentrations in the range of twenty percent (20%) to twenty-five percent (25%) by volume. Double ring aromatics or naphthalenes are separately limited at three percent (3%) because of their adverse effect on combustion. The aromatic content of turbine fuels varies with crude source and processing with typical values from ten percent (10%) to over twenty percent (20%). The aromatic content of synthetic fuels manufactured by processes, such as Fisher-Tropsch, can be lower. In certain embodiments, heating the fuel in response to a sensed contrail condition using the contrail mitigation system 230 thermally stresses aromatics and other particulate emission precursors in the fuel to form fuel born coke, allowing for pre-combustion filtration and reducing overall gas turbine particulate emissions. Thermal stressing of the aromatics can reduce the residual aromatic content to five percent (5%) or less and, thus, the contrail mitigation system 230 discussed herein may be particularly advantageous for hydrocarbon fuel that includes aromatic hydrocarbons, such as hydrocarbon fuel with the concentration of the aromatic hydrocarbons in the hydrocarbon fuel from ten percent (10%) by volume to twenty-five percent (25%) by volume.

To remove these molecules, the contrail mitigation system 230 is selectively operable to promote fuel precipitates, such as coke particles, precipitated aromatics, and other smoke precursors. In many instances, coke formation is undesirable as it can lead to the formation of carbonaceous deposits forming on various components of the turbine engine 100 and the fuel system 200. As the deposits collect, they can become sufficiently large to reduce or even to obstruct fluid flow. In the case of a fuel circuit, such carbon deposition can lead to degraded engine performance, reduced heat transfer efficiencies, increased pressure drops, and increased rates of material corrosion and erosion, all of which can necessitate the use of expensive de-coking procedures and even replacement of fuel nozzles. The contrail mitigation system 230 discussed herein, however, actively promotes the formation of coke in the hydrocarbon fuel when conditions are likely that a contrail may be formed or when a contrail is detected.

The formation of fuel precipitates, such as coke particles, is accelerated at elevated temperatures, such as temperatures from four hundred degrees Fahrenheit (400° F.) to nine hundred degrees Fahrenheit (900° F.). The contrail mitigation system 230 includes a heater (referred to as a contrail fuel heater 232) in fluid communication with the fuel delivery assembly 202. The contrail fuel heater 232 be any suitable heater, such as an electrical resistance heater, a catalytic heater, or a burner. In some embodiments, such as the one depicted in FIG. 3, the contrail fuel heater 232 can be a heat exchanger that is in thermal communication with any suitable heat source, such as any suitable engine and/or aircraft heat source. Such an engine heat source can include, for example, a flow path of heated air through the engine 100, such as the core air 145 flowing through the core air flow path 140. The contrail fuel heater 232 can be fluidly connected to, for example, the compressor cooling air (CCA) system that provides compressor bleed air to cool the HP turbine 132. The contrail fuel heater 232 can be thermally connected to other portions of the core air flow path 140 (FIG. 2), including the core air exhaust nozzle 143 (FIG. 2). Additionally or alternatively, in other embodiments, the contrail fuel heater 232 can be thermally coupled to an intermediate thermal transfer system, which is in turn thermally coupled to one or more systems of the engine 100, or a flow path for air through the engine 100. The contrail fuel heater 232 can be thermally coupled to the intermediate thermal transfer system 169 to receive heat from these heat sources.

As will be discussed in more detail below, when contrails, particularly, persistent contrails, are detected or when conditions are such that contrail formation is likely, the controller 170 operates the contrail mitigation system 230. More specifically, the contrail fuel heater 232 is operated to heat the hydrocarbon fuel in the fuel delivery assembly 202 to generate fuel precipitates, such as coke particles, in the hydrocarbon fuel. In certain embodiments, the contrail fuel heater 232 can be operated to heat the hydrocarbon fuel to temperatures from four hundred degrees Fahrenheit (400° F.) to nine hundred degrees Fahrenheit (900° F.). In some embodiments, the contrail fuel heater 232 is operated to heat the hydrocarbon fuel to temperatures from four hundred degrees Fahrenheit (400° F.) to six hundred degrees Fahrenheit (600° F.). As discussed above, the fuel precipitates may lead to undesirable operating conditions, and the contrail mitigation system 230 includes a fuel precipitate separator 234, configured to separate, to collect, and to remove the fuel precipitates from the hydrocarbon fuel. The fuel precipitate separator 234 is located downstream of the contrail fuel heater 232 and, in certain embodiments, is located directly downstream of the contrail fuel heater 232 to remove the fuel precipitates before the precipitates have a chance to deposit on other portions of the fuel system 200.

The fuel precipitate separator 234 can be a filter, referred to herein as a coke filter, that can include at least one filter configured to collect the coke. In some embodiments, only a single filter may be used, but, with a single filter sized to collect fine particles of coke, the lifetime (time on wing) may be limited as particles may collect rapidly. The coke filter can thus include a plurality of filters arranged in series, with the micron rating of the filters being progressively lower corresponding to the direction of the flow of the fuel. In some embodiment, to collect the fuel precipitates discussed herein, the coke filter (or smallest filter when a plurality of filters are used) has a nominal micron rating from five microns (5 μm) to twenty-five microns (25 μm), but can be larger, such as sixty-five microns (65 μm). Given the small size of incipient coke particles, typically well under a tenth of a micron (0.1 μm) the primary mode of filtration would be particle diffusion to filter media rather than active straining. The fuel precipitate separator 234 can be other separators configured to remove the fuel precipitates, such as cyclonic separators.

The contrail fuel heater 232 and the precipitate separator 234 are depicted as being located downstream of the main fuel pump 212 downstream of the fuel metering unit 220, and upstream of the fuel manifold 128, but the contrail fuel heater 232 and the precipitate separator 234 can be located at other locations within the fuel system 200 to heat the fuel and to remove the fuel precipitates, such as coke particles, from the fuel before the fuel reaches the fuel nozzles 126. The controller 170 operating the contrail mitigation system 230 is shown herein as being the engine controller, but the controller can also be a stand-alone controller.

As shown in FIG. 3, the fuel system 200 also can include the de-oxygenation system 222 that, under normal operations, is configured to reduce the amount of oxygen in the fuel. Oxygen in the fuel can be a contributor to thermal oxidation of the fuel and the generation of coke, particularly, at temperatures greater than three hundred degrees Fahrenheit. In this embodiment, the de-oxygenation system 222 is in fluid communication with the fuel delivery assembly 202 at a position upstream of the fuel nozzles, such that the de-oxygenation system 222 reduces the oxygen content of the fuel supplied to the fuel nozzles 126. As shown in FIG. 3, the de-oxygenation system 222 also is upstream of the fuel metering unit 220 and the main fuel pump 212. The de-oxygenation system 222 is downstream of the main filter 218. Suitable de-oxygenation systems include, for example, a sparging system that reduces the oxygen concentration in the fuel.

The de-oxygenation system 222 is selectively operable to reduce the concentration of oxygen in the hydrocarbon fuel and, more specifically, the dissolved diatomic oxygen content from an input oxygen content measured at an inlet of the de-oxygenation system 222 to an output oxygen content measured at an outlet of the de-oxygenation system 222. The fuel provided by the de-oxygenation system 222 can have an oxygen content of less than ten parts per million ("ppm"), such as less than five ppm, such as less than three ppm, such as less than two ppm, such as less than one ppm, and such as less than a half ppm. Oxygen in the fuel can be a contributor to thermal oxidation of the fuel and the generation of coke, particularly, at temperatures greater than three hundred degrees Fahrenheit. Accordingly, when contrail formation is not likely or is not occurring, the de-oxygenation system 222 can be operated to reduce the oxygen concentration in the fuel to the concentrations discussed above and to reduce coke formation. When contrails are forming or contrail formation is likely and the contrail mitigation system 230 is operating, reducing the oxygen concentration is not desirable, as the reduced oxygen content may reduce the amount of coke particulates forming from the hydrocarbon fuel. When the contrail mitigation system 230 is active, the controller 170 can turn off or otherwise reduce the oxygen scavenging ability of the de-oxygenation system 222 to increase the oxygen content, such as to facilitate coke formation and filtration prior to combustion. Variation of de-oxygenation between low oxygen levels in non-contrail conditions and higher oxygen levels in contrail mitigation conditions should higher temperature fuel be desired for thermal management and performance optimization nominally. When these higher oxygen levels are desired, the controller 170 can operate the de-oxygenation system 230 to obtain an output oxygen content of dissolved diatomic oxygen between ten (10) ppm and seventy (70) ppm.

Figure 4:
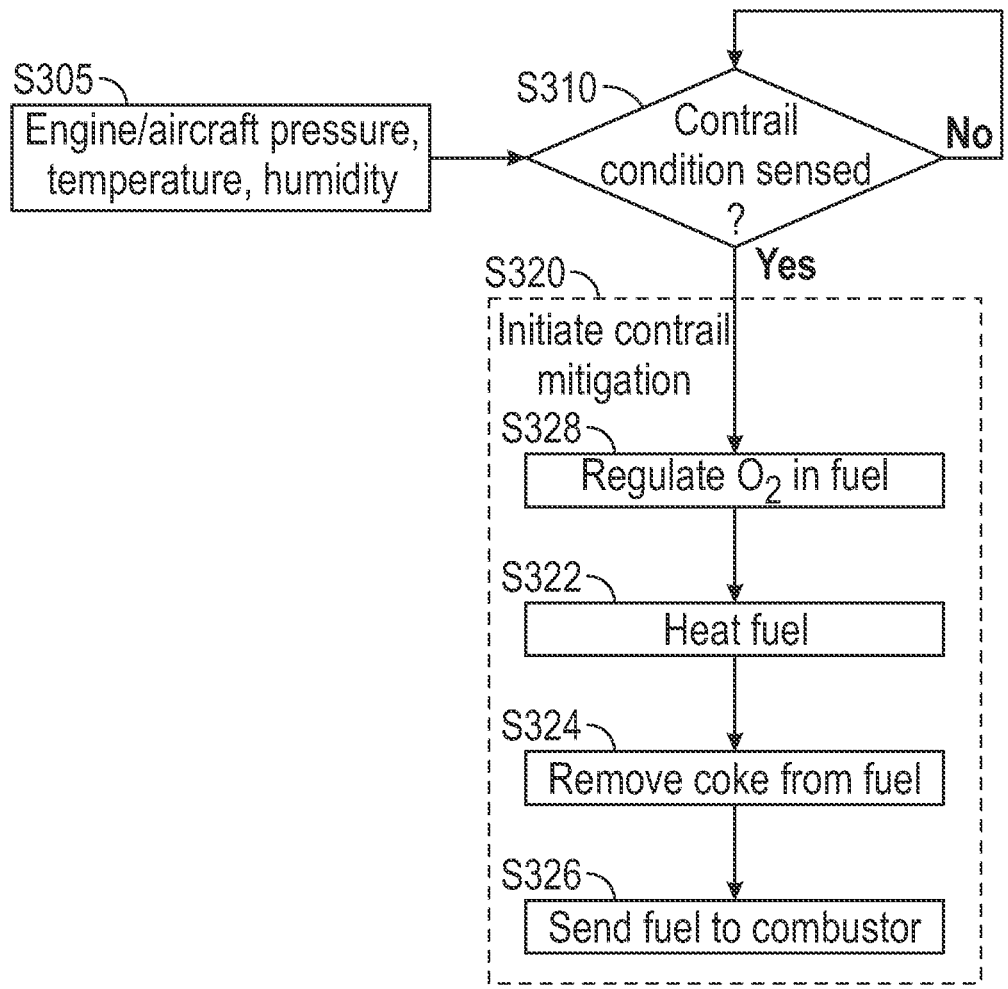
FIG. 4 is a flow chart showing a method of controlling the turbine engine to mitigate contrail formation according to an embodiment of the present disclosure.

FIG. 4 is a flow chart showing a method of controlling the turbine engine 100 and, more specifically, the contrail mitigation system 230 to mitigate contrail formation accordingly. Additional details of the method are described above relative to the operation and the description of the aforementioned components. This method can be implemented by the controller 170, and the controller 170 can be configured to perform the steps of the method discussed below. In some embodiments, the controller 170 includes one or more of the steps of the methods discussed herein as instructions stored on a non-transitory computer readable storage medium, such as the memory 174. These instructions can be executed by the processor 172.

The method can begin by monitoring, in step S305, the operational conditions of any one or all of the aircraft 10, the turbine engine 100, or ambient air. As noted above, the controller 170 can be communicatively coupled to one or more sensors 176 to receive an input from each of the sensors 176 that are used to monitor these operational conditions. As shown in FIG. 2, the sensors 176 can include engine air sensors 180. The engine air sensors 180 are located on or within the turbine engine 100 to measure a parameter of the air flowing in or around the turbine engine 100. The engine air sensors 180 can include temperature sensors, pressure sensors, or hygrometers (or other humidity sensors), measuring the temperature, pressure, or humidity, respectively, of the air flowing in or around the turbine engine 100. Although described below as a single sensor, a plurality of engine air sensors 180 can be located at each position discussed below to measure a plurality of parameters.

As discussed above, the turbine engine 100 includes air discharge nozzles, such as the core air exhaust nozzle 143 discharging the combustion gases 149 and the bypass air discharge nozzle 169 discharging the bypass air 168 from the turbine engine 100. A sensor of the engine air sensors 180 can be positioned on the turbine engine to measure a parameter of the air being discharged from the air discharge nozzle. For example, a core exhaust sensor 182 can be positioned to measure the pressure or the temperature of the combustion gases 149 being exhausted from the core air exhaust nozzle 143, and/or a bypass discharge sensor 184 can be positioned to measure the pressure or the temperature of the bypass air 168 being discharged from the bypass air discharge nozzle 169.

Other engine air sensors 180 can be positioned to measure air flowing into the turbine engine 100. For example, an inlet sensor 186 is positioned to measure the temperature or the pressure of the volume of air 166 flowing into the turbine engine 100. The inlet sensor 186 can be positioned on an inner surface of the nacelle 160, for example. Another engine air sensor 180 can include an ambient air sensor 188 positioned on the turbine engine 100, such as on an outer surface of the nacelle 160 to measure the temperature, the pressure, or the humidity of the ambient air flowing around the turbine engine 100. Although the ambient air sensor 188 is shown in FIG. 2 as being located on the turbine engine 100, the ambient air sensor 188 can be located elsewhere on the aircraft 10.

In step S310, the method includes determining if contrail formation is likely (e.g., a contrail condition sensed) based on the parameter(s) measured by one or more of the engine air sensors 180. The input to make this determination can include the input from the engine air sensors 180 and may be referred to herein as if a contrail condition is not sensed or determined, the monitoring continues as described above with step S310, but if a contrail condition, indicating that contrail formation is likely or otherwise occurring, is sensed, the method proceeds to step S320 to initiate contrail mitigation using the contrail mitigation system 230. The contrail mitigation can include heating the fuel using the contrail fuel heater 232 in step S322, removing the fuel precipitates from the fuel, using the precipitate separator 234 in step S324, and, then, sending the fuel to the combustion chamber 124 in step S326. As discussed above, in some embodiments, the method can include increasing the dissolved oxygen content of the fuel, such as by turning off the de-oxygenation system 222, or otherwise regulating the dissolved oxygen content in the fuel in step S328.

When the method is implemented by the controller 170, the controller 170 receives contrail mitigation input and implements the contrail mitigation step S320, as described above, based on the contrail mitigation input. The contrail mitigation input can include the input from the engine air sensors 180, and, from that input, the controller determines if conditions are right for contrail formation (i.e., that a contrail is likely). Such a determination can be made, for example, by calculating a parameter called the contrail factor that takes into takes into account a water to air ratio, pressures, or temperatures coming out of the turbine engine 100 (using, e.g., the core exhaust sensor 182 or the bypass discharge sensor 184 in comparison to ambient).

Alternatively, the contrail mitigation input can be an input, such as a command, to activate the contrail mitigation system 230. For example, the pilots of the aircraft can determine that contrails are forming and send a single, using an appropriate input device, to activate the contrail mitigation system 230. Other inputs can include inputs based on various aircraft diagnostic systems including, for example, offboard diagnostic systems, such as satellite imagery or ambient condition prediction models.

In another approach, a sensor can be used to determine the presence of a contrail behind the turbine engine 100 and/or the aircraft 10. Such a sensor can include an image sensor 190. As shown in FIG. 1, the image sensor 190 can be located on the aircraft 10, such as on the turbine engine 100, to have a field of view of an environment aft the turbine engine 100. Image sensors 190 can include visual image sensors (e.g., cameras that sense visual light to create still images or video images), infrared image sensors, radar image sensors, LiDAR image sensors, and the like. More specifically, the turbine engine 100 can include an engine image sensor 192 positioned on the turbine engine 100, such as on the nacelle 160 to face aft and to capture an image of the exhaust from the turbine engine 100. Additionally or alternatively, a wing image sensor 194 can be positioned on the wing 14, particularly, when the turbine engine 100 is mounted in an under-wing configuration, to face aft and to capture an image of the exhaust from the turbine engine 100. The image sensor 190 can be located elsewhere on the aircraft 10, including on the fuselage 12, such as, on the empennage 16. Such an image sensor is referred to herein as a fuselage image sensor 196, and the fuselage image sensor 196 is positioned on the fuselage 12 to face aft and to capture an image of the exhaust from the turbine engine 100.

The image sensor 190 is coupled to an image processor 178 (FIG. 3). The image sensor 190 is configured to send images captured by the image sensor 190 to the image processor 178, and the image processor 178 is configured to receive the images from the image sensor 178. The image processor 178 is used to analyze, by executing an image analysis process, the images captured by the image sensor 190 to determine whether a contrail (e.g., a persistent contrail) is present in the image. The image analysis process can include an object recognition process to identify the presence of a contrail, such as a persistent contrail. For example, an artificial neural network trained to identify a contrail, such as a persistent contrail, can be used as the object recognition process.

The image processor 178 can be incorporated into the controller 170 either as a separate processor or as the processor 172, and, in this way, the image processor 178 is communicatively coupled to the controller 170 as part of the internal connections of the controller. In other embodiments, the image processor 178 can be a processor that is part of a computing device (with its own memory) separate from the controller. When the image processor 178 is separate from the controller 170, the image processor 178 is communicatively coupled to the controller 170 to provide an input indicating that a contrail has been detected to the controller 170 as the contrail mitigation input.

In the embodiment discussed above, the image sensor 190 is located on the aircraft 10, but the image sensor 190 can be located on a remote monitoring location, such as, for example, a satellite. The satellite can detect the presence of a contrail. The satellite can be communicatively coupled to the aircraft 10, and, more specifically, the controller 170, and the satellite can send the contrail mitigation input when the satellite detects the presence of a contrail behind the aircraft 10.

The contrail mitigation systems discussed herein can be activated when contrails are detected or conditions are such that contrail formation is likely. These contrail mitigation systems reduce particles in the exhaust gases by purposely generating fuel precipitates, such as coke particles, in a hydrocarbon fuel and removing those particles before the hydrocarbon fuel is injected and combusted in the combustor. Further aspects of the present disclosure are provided by the subject matter of the following clauses.

A turbine engine for an aircraft comprises a fuel delivery assembly for a hydrocarbon fuel to flow therethrough, a core air flow path for core air to flow therethrough, a combustor positioned in the core air flow path to receive compressed air and fluidly coupled to the fuel delivery assembly to receive the hydrocarbon fuel, the hydrocarbon fuel being injected into the combustor to mix with the compressed air to generate a fuel and air mixture, the fuel and air mixture being combusted in the combustor to generate combustion gases, a core air exhaust nozzle located downstream of the combustor to receive the combustion gases and to exhaust the combustion gases from the turbine engine, a contrail mitigation system including a heater fluidly connected to the fuel delivery assembly upstream of the combustor and selectively operable to heat the hydrocarbon fuel and to generate fuel precipitates in the hydrocarbon fuel, and a fuel precipitate separator fluidly connected to the fuel delivery assembly upstream of the combustor and downstream of the heater to separate the fuel precipitates generated by the heater from the fuel, and a controller coupled to the heater, the controller configured to receive a contrail mitigation input and, based on the contrail mitigation input, to operate the heater to heat the hydrocarbon fuel and to generate fuel precipitates in the hydrocarbon fuel.

The turbine engine of the preceding clause, the controller being coupled to a plurality of sensors to receive an input from each sensor of the plurality of sensors, the input from the plurality of sensors being the contrail mitigation input, and the controller is further configured to determine if contrail formation is likely based on the input from the plurality of sensors and to operate the heater to heat the hydrocarbon fuel and to generate fuel precipitates in the hydrocarbon fuel when the controller determines that contrail formation is likely.

The turbine engine of any preceding clause, the hydrocarbon fuel supplied by the fuel delivery assembly including aromatic hydrocarbons, the concentration of the aromatic hydrocarbons in the hydrocarbon fuel being from 10 percent by volume to 25 percent by volume.

The turbine engine of any preceding clause, the heater heating the hydrocarbon fuel to a temperature from 400° F. to 900° F.

The turbine engine of any preceding clause, the heater being a heat exchanger to receive heat from a heat exchange fluid and to heat the hydrocarbon fuel.

The turbine engine of any preceding clause, the heater being a heat exchanger thermally coupled to the core air flow path to receive heat from the core air and to heat the hydrocarbon fuel.

The turbine engine of any preceding clause, further comprising a de-oxygenation system fluidly connected to fuel delivery assembly upstream of the combustor, the de-oxygenation system selectively operable to reduce the concentration of oxygen in the hydrocarbon fuel from an input oxygen content to an output oxygen content.

The turbine engine of any preceding clause, the controller being configured to operate the de-oxygenation system to increase the concentration of the oxygen in the output oxygen content when the controller receives the contrail mitigation input.

The turbine engine of any preceding clause, the controller being configured to turn off the de-oxygenation system when the controller receives the contrail mitigation input.

The turbine engine of any preceding clause, the controller being configured to operate the de-oxygenation system to obtain an output oxygen content of dissolved diatomic oxygen between 10 ppm and 70 ppm.

The turbine engine of any preceding clause, the controller being coupled to a sensor to receive an input from the sensor, the input from the sensor being the contrail mitigation input, and the controller is further configured to determine if contrail formation is likely based on the input from the sensor and to operate the heater to heat the hydrocarbon fuel and to generate fuel precipitates in the hydrocarbon fuel when the controller determines that contrail formation is likely.

The turbine engine of any preceding clause, the sensor being at least one of a temperature sensor, a pressure sensor, or a humidity sensor.

The turbine engine of any preceding clause further comprises a turbo-engine including the core air flow path, the combustor, and the core air exhaust nozzle, and a nacelle circumferentially surrounding the turbo-engine and defining a bypass airflow passage between the nacelle and the turbo-engine engine, the sensor being located on the nacelle.

The turbine engine of any preceding clause, a volume of air entering the turbine engine being split and flows into the bypass airflow passage as bypass air and flows into the core air flow path as the core air, the sensor being located to measure a parameter of the air entering the turbine engine.

The turbine engine of any preceding clause, further comprising an air discharge nozzle, the sensor being positioned on the turbine engine to measure a parameter of the air being discharged from the air discharge nozzle.

The turbine engine of any preceding clause, the air discharge nozzle being the core air exhaust nozzle and the sensor measures a parameter of the combustion gases exhausted from the core air exhaust nozzle.

The turbine engine of any preceding clause further comprises a turbo-engine including the core air flow path, the combustor, and the core air exhaust nozzle, and a nacelle circumferentially surrounding the turbo-engine and defining a bypass airflow passage between the nacelle and the turbo-engine engine, a volume of air entering the turbine engine being split and flowing into the bypass airflow passage as bypass air and flowing into the core air flow path as the core air, the air discharge nozzle being a discharge nozzle for the bypass air and the sensor measures a parameter of bypass air.

The turbine engine of any preceding clause, the sensor being an image sensor positioned to capture an image of the environment aft of the engine, the sensor being coupled to an image processor configured to determine if a contrail is present in the image captured by the image sensor, and to generate the contrail mitigation input when the image processor determines a contrail is present in the image captured by the image sensor, and the controller being coupled to the image processor to receive the contrail mitigation input from the image processor.

The turbine engine of any preceding clause, further comprising the image sensor.

An aircraft comprising the turbine engine of any preceding clause, the image sensor being located on the aircraft.

The turbine engine any preceding clause, wherein the fuel precipitate separator collects the fuel precipitates generated by the heater.

The turbine engine any preceding clause, wherein the fuel precipitate separator includes at least one filter.

The turbine engine the preceding clause, wherein the at least one filter has a nominal micron rating of nominal micron rating from 5 µm to 25 µm.

The turbine engine any preceding clause, wherein the fuel precipitate separator includes a plurality of filters.

The turbine engine any preceding clause, wherein the fuel precipitate separator is a cyclonic separator.

A method of operating a turbine engine for an aircraft. The method includes supplying a hydrocarbon fuel to a combustor positioned in a core air flow path to receive compressed air, injecting the hydrocarbon fuel to the combustor to mix with the compressed air to generate a fuel and air mixture, combusting the fuel and air mixture in the combustor to generate combustion gases, and exhausting the combustion gases from the turbine engine. The method also includes determining if contrail formation is likely or is occurring. If contrail formation is likely or is occurring, the method further includes operating a heater to heat the hydrocarbon fuel and to generate fuel precipitates in the hydrocarbon fuel and removing the fuel precipitates from the hydrocarbon fuel prior to injecting the fuel into the combustor.

The method of the preceding clause, further comprising filtering the hydrocarbon fuel with a filter to remove the fuel precipitates from the hydrocarbon fuel.

The method of any preceding clause, if contrail formation is likely or is occurring, the method including operating the heater to heat the hydrocarbon fuel to a temperature from 400° F. to 900° F.

The method of any preceding clause, further comprising reducing the dissolved oxygen content in the fuel to a reduced oxygen content, when contrail formation is not likely or is not occurring.

The method of any preceding clause, further comprising increasing the dissolved oxygen content in the fuel to a reduced oxygen content, when contrail formation is likely or is occurring.

The method of any preceding clause, wherein the turbine engine includes a de-oxygenation system upstream of the combustor, the de-oxygenation system selectively operable to reduce the concentration of oxygen in the hydrocarbon fuel from an input oxygen content to an output oxygen content, and the method further comprises controlling the de-oxygenation system de-oxygenation system based on the determining if contrail formation is likely or is occurring.

The method of the preceding clause, further comprising turning off the de-oxygenation system when contrail formation is likely or is occurring.

The method of any preceding clause, wherein the supplied hydrocarbon fuel supplied aromatic hydrocarbons, the concentration of the aromatic hydrocarbons in the hydrocarbon fuel being from 10 percent by volume to 25 percent by volume.

The method of any preceding clause, further comprising determining if a contrail is occurring by visual observation.

The method of the preceding clause, wherein visual observation includes using an image sensor to detect the presence of a contrail.

The method of the preceding clause, wherein the image sensor is configured to send images captured by the image sensor to an image processor. The image processor is configured to receive the images from the image sensor, analyze, by executing an image analysis process, the images captured by the image sensor to determine whether a contrail is present in the image.

The method of the preceding clause, wherein the image analysis process includes an object recognition process to identify the presence of a contrail.

The method of any preceding clause, further comprising determining if contrail formation is likely or is occurring by measuring a parameter of air flowing in or around the turbine engine.

The method of the preceding clause, wherein the parameter is at least one of temperature, pressure, or humidity.

The method of any preceding clause, wherein measuring a parameter of air flowing in or around the turbine engine includes using the sensors of any preceding clause.

The method of any preceding clause, further comprising operating the turbine engine of any preceding clause.

A non-transitory computer readable storage medium having stored thereon a plurality of instructions according to the method of any preceding clause.

A contrail mitigation system comprising a controller configured to execute the method of any preceding clause.

A gas turbine engine of any preceding clause including the contrail mitigation system of the preceding clause.

Although the foregoing description is directed to certain embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A turbine engine for an aircraft, the turbine engine comprising:
   a fuel delivery assembly for a hydrocarbon fuel to flow therethrough;
   a core air flow path for core air to flow therethrough;
   a combustor positioned in the core air flow path to receive compressed air and fluidly coupled to the fuel delivery assembly to receive the hydrocarbon fuel, the hydrocarbon fuel being injected into the combustor to mix with the compressed air to generate a fuel and air mixture, the fuel and air mixture being combusted in the combustor to generate combustion gases;
   a core air exhaust nozzle located downstream of the combustor to receive the combustion gases and to exhaust the combustion gases from the turbine engine;
   a contrail mitigation system including:
      a heater fluidly connected to the fuel delivery assembly upstream of the combustor and selectively operable to heat the hydrocarbon fuel and to generate fuel precipitates in the hydrocarbon fuel; and
      a fuel precipitate separator fluidly connected to the fuel delivery assembly upstream of the combustor and downstream of the heater to separate the fuel precipitates generated by the heater from the fuel; and
   a controller coupled to the heater, the controller configured to receive a contrail mitigation input and, based on the contrail mitigation input, to operate the heater to heat the hydrocarbon fuel and to generate the fuel precipitates in the hydrocarbon fuel.

2. The turbine engine of claim 1, wherein the controller is coupled to a plurality of sensors to receive an input from each sensor of the plurality of sensors, the input from the plurality of sensors being the contrail mitigation input, and the controller is further configured to determine if contrail formation is likely based on the input from the plurality of sensors and to operate the heater to heat the hydrocarbon fuel and to generate fuel precipitates in the hydrocarbon fuel when the controller determines that contrail formation is likely.

3. The turbine engine of claim 1, wherein the hydrocarbon fuel supplied by the fuel delivery assembly includes aromatic hydrocarbons, a concentration of the aromatic hydrocarbons in the hydrocarbon fuel being from 10 percent by volume to 25 percent by volume.

4. The turbine engine of claim 1, wherein the heater heats the hydrocarbon fuel to a temperature from 400° F. to 900° F.

5. The turbine engine of claim 1, wherein the heater is a heat exchanger to receive heat from a heat exchange fluid and to heat the hydrocarbon fuel.

6. The turbine engine of claim 1, wherein the heater is a heat exchanger thermally coupled to the core air flow path to receive heat from the core air and to heat the hydrocarbon fuel.

7. The turbine engine of claim 1, further comprising a de-oxygenation system fluidly connected to the fuel delivery assembly upstream of the combustor, the de-oxygenation system selectively operable to reduce a concentration of oxygen in the hydrocarbon fuel from an input oxygen content to an output oxygen content.

8. The turbine engine of claim 7, wherein the controller is configured to operate the de-oxygenation system to increase the concentration of the oxygen in the output oxygen content when the controller receives the contrail mitigation input.

9. The turbine engine of claim 8, wherein the controller is configured to turn off the de-oxygenation system when the controller receives the contrail mitigation input.

10. The turbine engine of claim 8, wherein the controller is configured to operate the de-oxygenation system to obtain an output oxygen content of dissolved diatomic oxygen between 10 ppm and 70 ppm.

11. The turbine engine of claim 1, wherein the controller is coupled to a sensor to receive an input from the sensor, the input from the sensor being the contrail mitigation input, and the controller is further configured to determine if contrail formation is likely based on the input from the sensor and to operate the heater to heat the hydrocarbon fuel and to generate the fuel precipitates in the hydrocarbon fuel when the controller determines that contrail formation is likely.

12. The turbine engine of claim 11, wherein the sensor is at least one of a temperature sensor, a pressure sensor, or a humidity sensor.

13. The turbine engine of claim 11, further comprising:
a turbo-engine including the core air flow path, the combustor, and the core air exhaust nozzle; and
a nacelle circumferentially surrounding the turbo-engine and defining a bypass airflow passage between the nacelle and the turbo-engine, the sensor being located on the nacelle.

14. The turbine engine of claim 13, wherein a volume of air entering the turbine engine is split and flows into the bypass airflow passage as bypass air and flows into the core air flow path as the core air, the sensor being located to measure a parameter of the air entering the turbine engine.

15. The turbine engine of claim 11, further comprising an air discharge nozzle, the sensor being positioned on the turbine engine to measure a parameter of air being discharged from the air discharge nozzle.

16. The turbine engine of claim 15, wherein the air discharge nozzle is the core air exhaust nozzle and the sensor measures a parameter of the combustion gases exhausted from the core air exhaust nozzle.

17. The turbine engine of claim 15, further comprising:
a turbo-engine including the core air flow path, the combustor, and the core air exhaust nozzle; and
a nacelle circumferentially surrounding the turbo-engine and defining a bypass airflow passage between the nacelle and the turbo-engine, a volume of air entering the turbine engine being split and flowing into the bypass airflow passage as bypass air and flowing into the core air flow path as the core air,
wherein the air discharge nozzle is a discharge nozzle for the bypass air and the sensor measures a parameter of bypass air.

18. The turbine engine of claim 11, wherein the sensor is an image sensor positioned to capture an image of an environment aft of the engine, the sensor being coupled to an image processor configured to determine if a contrail is present in the image captured by the image sensor, and to generate the contrail mitigation input when the image processor determines a contrail is present in the image captured by the image sensor, and
wherein the controller is coupled to the image processor to receive the contrail mitigation input from the image processor.

19. The turbine engine of claim 18, further comprising the image sensor.

20. An aircraft comprising the turbine engine of claim 18, wherein the image sensor is located on the aircraft.

* * * * *